US008692491B2

(12) United States Patent
Murai et al.

(10) Patent No.: US 8,692,491 B2
(45) Date of Patent: Apr. 8, 2014

(54) BRUSHLESS MOTOR DRIVER AND BRUSHLESS MOTOR SYSTEM

(75) Inventors: Shigeki Murai, Kawasaki (JP); Masatoshi Matsuda, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 189 days.

(21) Appl. No.: 13/069,576

(22) Filed: Mar. 23, 2011

(65) Prior Publication Data
US 2012/0119687 A1 May 17, 2012

(30) Foreign Application Priority Data

Nov. 17, 2010 (JP) .................................. 2010-256991

(51) Int. Cl.
*H02P 6/06* (2006.01)

(52) U.S. Cl.
USPC ............ 318/400.06; 318/400.34; 318/400.35; 318/400.11; 318/400.01; 318/432

(58) Field of Classification Search
USPC ................. 318/85, 701, 432, 400.11, 400.34, 318/400.35, 400.25, 799, 400.33, 400.06, 318/811, 798, 254.1, 259, 257, 59, 400.01
See application file for complete search history.

(56) References Cited

U.S. PATENT DOCUMENTS

| | | | | |
|---|---|---|---|---|
| 5,202,616 | A * | 4/1993 | Peters et al. | 318/400.09 |
| 5,311,105 | A * | 5/1994 | Nakai et al. | 318/400.32 |
| 5,491,393 | A * | 2/1996 | Uesugi | 318/400.28 |
| 6,538,404 | B2 * | 3/2003 | Kato et al. | 318/400.06 |
| 6,650,082 | B1 | 11/2003 | Du | |
| 7,095,195 | B2 * | 8/2006 | Tagome et al. | 318/268 |
| 7,126,301 | B2 * | 10/2006 | Nishihara et al. | 318/400.27 |
| 7,535,188 | B2 * | 5/2009 | Fukamizu et al. | 318/254.1 |
| 7,626,350 | B2 * | 12/2009 | Mori et al. | 318/432 |
| 7,977,899 | B2 * | 7/2011 | Hasegawa et al. | 318/400.01 |
| 8,258,732 | B2 * | 9/2012 | Iwaji et al. | 318/400.11 |
| 2001/0019249 | A1 * | 9/2001 | Kato et al. | 318/254 |

(Continued)

FOREIGN PATENT DOCUMENTS

| | | | | |
|---|---|---|---|---|
| JP | 06054037 A | * | 2/1994 | ............. H04M 1/00 |
| JP | 2004-166500 | | 6/2004 | |
| JP | 2007-236062 | | 9/2007 | |

*Primary Examiner* — Eduardo Colon Santana
*Assistant Examiner* — Jorge Carrasquillo
(74) *Attorney, Agent, or Firm* — White & Case LLP (57) ABSTRACT

The brushless motor driver includes a sample and hold circuit which samples and holds a first value of the first comparison signal in a first case in which a current is forced to flow from a first phase coil of the three-phase brushless motor to a second phase coil and no current is forced to flow to a third phase coil in a first period having a preset setting time and a second value of the first comparison signal in a second case in which a current is forced to flow from the second phase coil to the first phase coil and no current is forced to flow to the third phase coil in a second period having the preset setting time subsequent to the first period. The brushless motor driver includes an addition circuit which adds up the first value and the second value sampled and held by the sample and hold circuit and outputs an addition signal depending upon a result of the addition. The brushless motor driver includes a comparison output circuit which compares a value of the addition signal with a reference voltage and outputs a second comparison signal depending upon a result of the comparison. A position of a rotor in the three-phase brushless motor is discriminated on the basis of the second comparison signal.

19 Claims, 3 Drawing Sheets

(56) References Cited

U.S. PATENT DOCUMENTS

2002/0158470 A1* 10/2002 Suzuki et al. ............... 290/1 A
2006/0001389 A1* 1/2006 Suzuki et al. ............... 318/85
2007/0176567 A1* 8/2007 Maeda ....................... 318/254
2008/0048598 A1* 2/2008 Shibuya ..................... 318/400.1

* cited by examiner

| ROTOR POSITION DETECTION SIGNAL | | | ROTOR POSITION |
| --- | --- | --- | --- |
| A | B | C | SECTION |
| 1 | 1 | 0 | (a) |
| 0 | 1 | 0 | (b) |
| 0 | 1 | 1 | (c) |
| 0 | 0 | 1 | (d) |
| 1 | 0 | 1 | (e) |
| 1 | 0 | 0 | (f) |

FIG.3

BRUSHLESS MOTOR DRIVER AND BRUSHLESS MOTOR SYSTEM

CROSS-REFERENCE TO RELATED APPLICATION

This application is based upon and claims the benefit of priority from the prior Japanese Patent Application No. 2010-256991, filed on Nov. 17, 2010, the entire contents of which are incorporated herein by reference.

BACKGROUND

1. Field

Embodiments described herein relate generally to a brushless motor driver for driving a three-phase brushless motor and a brushless motor system.

2. Background Art

In the conventional motor drive method, the rotor position is fixed by, for example, letting a DC current flow from a certain phase of a motor to another phase. In addition, a current is forced to flow in a direction corresponding to a direction in which the motor is to be rotated, to rotate the motor forcibly. As a result, an induced voltage is generated and the induced voltage is detected. The position of the rotor is detected on the basis of the detected induced voltage, and the motor is subject to a sensorless drive.

In this conventional motor driving method, the position of the rotor is fixed, and then the motor is forcibly rotated to generate the induced voltage as described above. This results in a problem that it takes a long time until desired operation of the motor is started.

DETAILED DESCRIPTION

A brushless motor driver according to an embodiment drives a three-phase brushless motor. The brushless motor driver includes a detection comparison circuit which compares a neutral point voltage at a neutral point of the three-phase brushless motor with a comparison voltage obtained by dividing a voltage between terminals of a power device, which is supplied with a power supply voltage to supply drive voltages to the three-phase brushless motor, respectively connected to a power supply and ground to halves, and outputs a first comparison signal depending upon a result of the comparison. The brushless motor driver includes a sample and hold circuit which samples and holds a first value of the first comparison signal in a first case in which a current is forced to flow from a first phase coil of the three-phase brushless motor to a second phase coil and no current is forced to flow to a third phase coil in a first period having a preset setting time and a second value of the first comparison signal in a second case in which a current is forced to flow from the second phase coil to the first phase coil and no current is forced to flow to the third phase coil in a second period having the preset setting time subsequent to the first period. The brushless motor driver includes an addition circuit which adds up the first value and the second value sampled and held by the sample and hold circuit and outputs an addition signal depending upon a result of the addition. The brushless motor driver includes a comparison output circuit which compares a value of the addition signal with a reference voltage and outputs a second comparison signal depending upon a result of the comparison.

A position of a rotor in the three-phase brushless motor is discriminated on the basis of the second comparison signal.

Hereafter, embodiments of the present invention will be described with reference to the drawings.

(First Embodiment)

Figure 1:
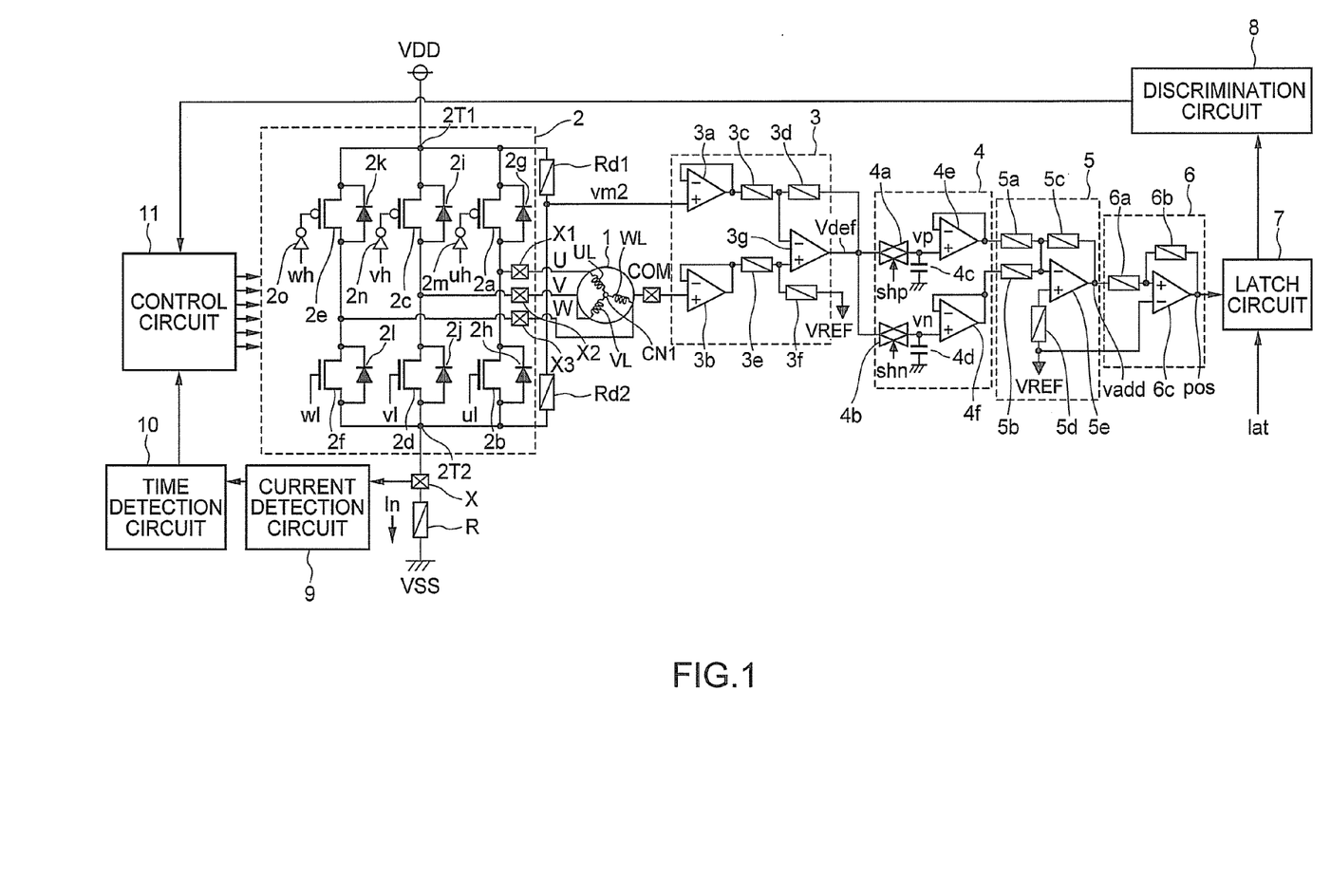
FIG. 1 is a diagram showing an example of a configuration of a brushless motor drive system 100 according to a first embodiment.

FIG. 1 is a diagram showing an example of a configuration of a brushless motor drive system 100 according to a first embodiment.

As shown in FIG. 1, the brushless motor drive system 100 includes a three-phase brushless motor 1, a power device 2, a detection comparison circuit 3, a sample and hold circuit 4, an addition circuit 5, a comparison output circuit 6, a latch circuit 7, a discrimination circuit 8, a current detection circuit 9, a time detection circuit 10, a control circuit 11, a detection resistor R, a first voltage division resistor Rd1, and a second voltage division resistor Rd2.

A brushless motor driver includes the detection comparison circuit 3, the sample and hold circuit 4, the addition circuit 5, the comparison output circuit 6, the latch circuit 7, the discrimination circuit 8, the current detection circuit 9, the time detection circuit 10, the control circuit 11, the detection resistor R, the first voltage division resistor Rd1, and the second voltage division resistor Rd2.

The brushless motor driver is configured to drive the three-phase brushless motor 1 by controlling the power device 2.

The three-phase brushless motor 1 includes a stator including three-phase coils UL, VL and WL respectively of U, V and W phases, and a rotor which is rotated by a rotating magnetic field generated by the stator. In the stator, the phase U coil UL, the phase V coil VL, and the phase W coil WL are connected commonly to a neutral point CN1. A voltage at the neutral point CN1 is a neutral point voltage COM. The three-phase brushless motor 1 is configured to be driven by three-phase drive voltages (signals).

In the ensuing description, it is assumed that the phase U coil of the three-phase brushless motor is a first phase coil, the phase V coil is a second phase coil, and the phase W coil is a third phase coil as an example. However, other combinations may be also used.

Furthermore, a power supply is configured to input a power supply voltage VDD to the power device 2.

The power device 2 is connected at its first end to the power supply and connected at its second end to ground via the detection resistor R. The power device 2 is configured to be supplied with the power supply voltage VDD from the power supply, and supply three-phase drive voltages (signals, currents) U, V and W to the three-phase brushless motor 1 in accordance with drive signals uh, vh, wh, ul, vl and wl generated by the control circuit 11.

The power device 2 includes six MOS transistors 2a to 2f, six diodes 2g to 2l, and three inverters 2m to 2o.

The pMOS transistor 2a supplied at its gate with the drive signal uh as its input via the inverter 2m and the nMOS transistor 2b supplied at its gate with the drive signal ul as its input are connected in series between the power supply and the ground. A terminal X1 between the pMOS transistor 2a and the nMOS transistor 2b is connected to the phase U coil UL of the three-phase brushless motor 1. The drive voltage U from the terminal X1 is supplied to the phase U coil UL.

Note that the diode 2g is connected at its cathode to a source of the pMOS transistor 2a and connected at its anode to a drain of the nMOS transistor 2a. The diode 2h is connected at its cathode to a drain of the nMOS transistor 2b and connected at its anode to a source of the nMOS transistor 2b.

The pMOS transistor 2c supplied at its gate with the drive signal vh as its input via the inverter 2n and the nMOS transistor 2d supplied at its gate with the drive signal vl as its input are connected in series between the power supply and the ground. A terminal X2 between the pMOS transistor 2c and the nMOS transistor 2d is connected to the phase V coil VL of the three-phase brushless motor 1. The drive voltage V from the terminal X2 is supplied to the phase V coil VL.

Note that the diode 2i is connected at its cathode to a source of the pMOS transistor 2c and connected at its anode to a drain of the pMOS transistor 2c. The diode 2j is connected at its cathode to a drain of the nMOS transistor 2d and connected at its anode to a source of the nMOS transistor 2d.

The pMOS transistor 2e supplied at its gate with the drive signal wh as its input via the inverter 2o and the nMOS transistor 2f supplied at its gate with the drive signal wl as its input are connected in series between the power supply and the ground. A terminal X3 between the pMOS transistor 2e and the nMOS transistor 2f is connected to the phase W coil WL of the three-phase brushless motor 1. The drive voltage W from the terminal X3 is supplied to the phase W coil WL.

Note that the diode 2k is connected at its cathode to a source of the pMOS transistor 2e and connected at its anode to a drain of the pMOS transistor 2e. The diode 2l is connected at its cathode to a drain of the nMOS transistor 2f and connected at its anode to a source of the nMOS transistor 2f.

Note that these MOS transistors 2a to 2f have, for example, the same size.

As already described, the three-phase brushless motor 1 is configured to be driven by currents which flow through the three-phase coils UL, VL and WL in response to the three-phase drive voltages U, V and W.

Furthermore, the first voltage division resistor Rd1 is connected at its first end to a first terminal 2T1 of the power device 2 connected to the power supply.

The second voltage division resistor Rd2 is connected at its first end to a second end of the first voltage division resistor Rd1, and connected at its second end to a second terminal 2T2 of the power device 2 connected to the ground. The second voltage division resistor Rd2 has the same resistance value as the first voltage division resistor Rd1.

A comparison voltage vm2 is a voltage at a node between the first voltage division resistor Rd1 and the second voltage division resistor Rd2.

A voltage between the terminals 2T1 and 2T2 of the power device 2 which are respectively connected to the power supply and the ground is a voltage between first ends (sources) of the pMOS transistors 2a, 2c and 2e and second ends (sources) of the nMOS transistors 2b, 2d and 2f. In other words, the comparison voltage vm2 is a voltage-divided voltage obtained by conducting voltage division on the voltage between the terminals 2T1 and 2T2 of the power device 2 which are respectively connected to the power supply and the ground (i.e., the voltage between the first ends (sources) of the pMOS transistors 2a, 2c and 2e and the second ends (sources) of the nMOS transistors 2b, 2d and 2f) with a ratio of 1:1.

Furthermore, the detection comparison circuit 3 is configured to compare the neutral point voltage COM at the neutral point CN1 of the three-phase brushless motor 1 with the comparison voltage vm2 and output a first comparison signal vdef depending upon a result of the comparison.

As shown in FIG. 1, the detection comparison circuit 3 includes, for example, a first detection voltage follower circuit 3a, a second detection voltage follower circuit 3b, resistors 3c to 3f, and a detection operational amplifier 3g.

The first detection voltage follower circuit 3a is configured to be supplied with the comparison voltage vm2 as its input.

The second detection voltage follower circuit 3b is configured to be supplied with the neutral point voltage COM as its input.

An output of the first detection voltage follower circuit 3a is connected to an inverting input terminal of the detection operational amplifier 3g via the resistor 3c. An output of the second detection voltage follower circuit 3b is connected to a non-inverting input terminal of the detection operational amplifier 3g via the resistor 3e. A second end of the resistor 3f connected at its first end to a reference voltage VREF is connected to the non-inverting input terminal of the detection operational amplifier 3g. The resistor 3d is connected between an output of the detection operational amplifier 3g and the inverting input terminal for the sake of gain adjustment.

The detection operational amplifier 3g is configured to compare the output of the first detection voltage follower circuit 3a with the output of the second detection voltage follower circuit 3b and output the first comparison signal vdef depending upon a result of the comparison.

The sample and hold circuit 4 is configured to, for example, sample and hold a first value of the first comparison signal vdef in a first case in which a current is forced to flow from the phase U (a first phase) coil UL to the phase V (a second phase) coil VL of the three-phase brushless motor 1 and no current is forced to flow to the phase W (a third phase) coil WL, in a first period of a preset setting time T in response to a sample and hold signal shp.

Note that the case in which a current is flow from the phase V coil VL to the phase W coil WL and no current is forced to flow to the phase U coil UL, and the case in which a current is forced to flow from the phase W coil WL to the phase U coil UL and no current is forced to flow to the phase V coil VL as described later are similar.

In addition, the sample and hold circuit 4 is configured to sample and hold a second value of the first comparison signal vdef in a second case in which a current is forced to flow from the phase V (the second phase) coil VL to the phase U (the first phase) coil UL and no current is forced to flow to the phase W (the third phase) coil WL, in a second period of a setting time T subsequent to the first period, in response to a sample and hold signal shn.

Note that the case in which a current is forced to flow from the phase W coil WL to the phase V coil VL and no current is forced to flow to the phase U coil UL, and the case in which no current is forced to flow from the phase U coil UL to the phase W coil WL and no current is forced to flow to the phase V coil VL as described later are similar.

As shown in FIG. 1, the sample and hold circuit 4 includes, for example, a first transmission gate 4a, a second transmission gate 4b, a first capacitor 4c, a second capacitor 4d, a first sample and hold voltage follower circuit 4e, and a second sample and hold voltage follower circuit 4f.

The first transmission gate 4a is configured to be supplied at its first end with the first comparison signal vdef and turn on during the first period in response to the sample and hold signal shp.

The first sample and hold voltage follower circuit 4e is configured so that the first capacitor 4c is connected between a second end of the first transmission gate 4a and the ground.

The first sample and hold voltage follower circuit 4e is configured to be supplied with a voltage vp at a first end of the first capacitor 4c and output a first voltage (voltage vp) corresponding to the first value.

The second transmission gate 4b is configured to be supplied at its first end with the first comparison signal vdef and turn on during the second period in response to the sample and hold signal shn.

The second capacitor 4d is connected between a second end of the second transmission gate 4b and the ground.

The second sample and hold voltage follower circuit 4f is configured to be supplied with a voltage vn at a first end of the second capacitor 4d and output a second voltage (voltage vn) corresponding to the second value.

The addition circuit 5 is configured to add up the first value and the second value which is sampled and held in the sample and hold circuit 4, in an analog form and output an addition signal vadd depending upon a result of the addition.

As shown in FIG. 1, the addition circuit 5 includes, for example, a first addition resistor 5a, a second addition resistor 5b, a resistor 5c, a resistor 5d, and an addition operational amplifier 5e.

The first addition resistor 5a is connected at its first end to the output of the first sample and hold voltage follower circuit 4e.

The second addition resistor 5b is connected at its first end to the output of the second sample and hold voltage follower circuit 4f, and connected at its second end to a second end of the first addition resistor 5a.

As described above, the first addition resistor 5a and the second addition resistor 5b are connected to each other. As a result, a voltage at a node between the first addition resistor 5a and the second addition resistor 5b becomes a voltage obtained by compounding (adding in an analog manner) the voltage which is output by the first sample and hold voltage follower circuit 4e and the voltage which is output by the second sample and hold voltage follower circuit 4f.

The addition operational amplifier 5e is configured to compare the voltage at the node between the first addition resistor 5a and the second addition resistor 5b with a voltage at a second end of the bias resistor connected at its first end to the reference voltage VREF and output the addition signal vadd on the basis of the comparison.

Furthermore, the comparison output circuit 6 is configured to compare a value of the addition signal vadd with the reference voltage VREF (for example, a voltage which is half of the power supply voltage of the addition circuit) and output a second comparison signal (rotor position detection signal) pos which depends upon a result of the comparison.

As shown in FIG. 1, the comparison output circuit 6 includes, for example, an output resistor 6a, a resistor 6b, and an output comparator 6c.

The output resistor 6a is connected at its first end to the output of the addition operational amplifier 5e.

The output comparator 6c is configured to compare a voltage at a second end of the output resistor 6a with the reference voltage VREF (for example, the voltage which is half of the power supply voltage of the addition circuit) and output the second comparison signal (rotor position detection signal) pos which depends upon a result of the comparison. The resistor 6b for hysteresis operation is connected between the output of the output comparator 6c and a noninverting input terminal of the output comparator 6c.

Furthermore, the latch circuit 7 is configured to latch a value of the second comparison signal (rotor position detection signal) pos in response to a latch signal lat.

Furthermore, the discrimination circuit 8 is configured to discriminate the rotor position of the three-phase brushless motor 1 on the basis of the value latched in the latch circuit. In other words, the rotor position of the three-phase brushless motor 1 is discriminated on the basis of the second comparison signal.

Furthermore, the current detection circuit 9 is configured to, detect a current Im which flows through the power device 2, for example, in a state in which a dummy current is forced to flow from the phase U (the first phase) coil UL to the phase V (the second phase) coil VL and no dummy current is not forced to flow through the phase W coil (the third phase) coil WL. The combination of coils may be different from the above-described combination.

The dummy current flowing is executed to set a current flowing time (setting time T) for detecting the rotor position before the already described current flowing for detecting the rotor position. And time taken for the current Im to arrive at a predetermined current (prescribed value) Ia is measured by the dummy current flowing as described later.

Furthermore, the time detection circuit 10 is configured to detect a time between start of the dummy current flowing and arrival of the current Im detected by the current detection circuit 9 at the prescribed value Ia.

The control circuit 11 is configured to control the power device 2 with the drive signals uh, vh, wh, ul, vl and wl and thereby supply three-phase drive voltages (signals, currents) to the three-phase brushless motor 1. As a result, operation of the three-phase brushless motor it is controlled.

The control circuit 11 controls the power device 2 to force to let a current through the three-phase brushless motor 1 (for example, at 120°) and rotate it on the basis of the position of the rotor discriminated by the discrimination circuit 8.

In addition, the control circuit 11 controls the power device 1 to let a dummy current flow through the three-phase brushless motor 1. The current detection circuit 9 measures the current Im.

The time detection circuit 10 detects the time for the current Im to arrive at the prescribed value Ia. And the control circuit 11 sets the time detected by the time detection circuit 10 as setting time T. An example of operation of the brushless motor drive system 100 having the configuration described heretofore will now be described.

Figure 2:
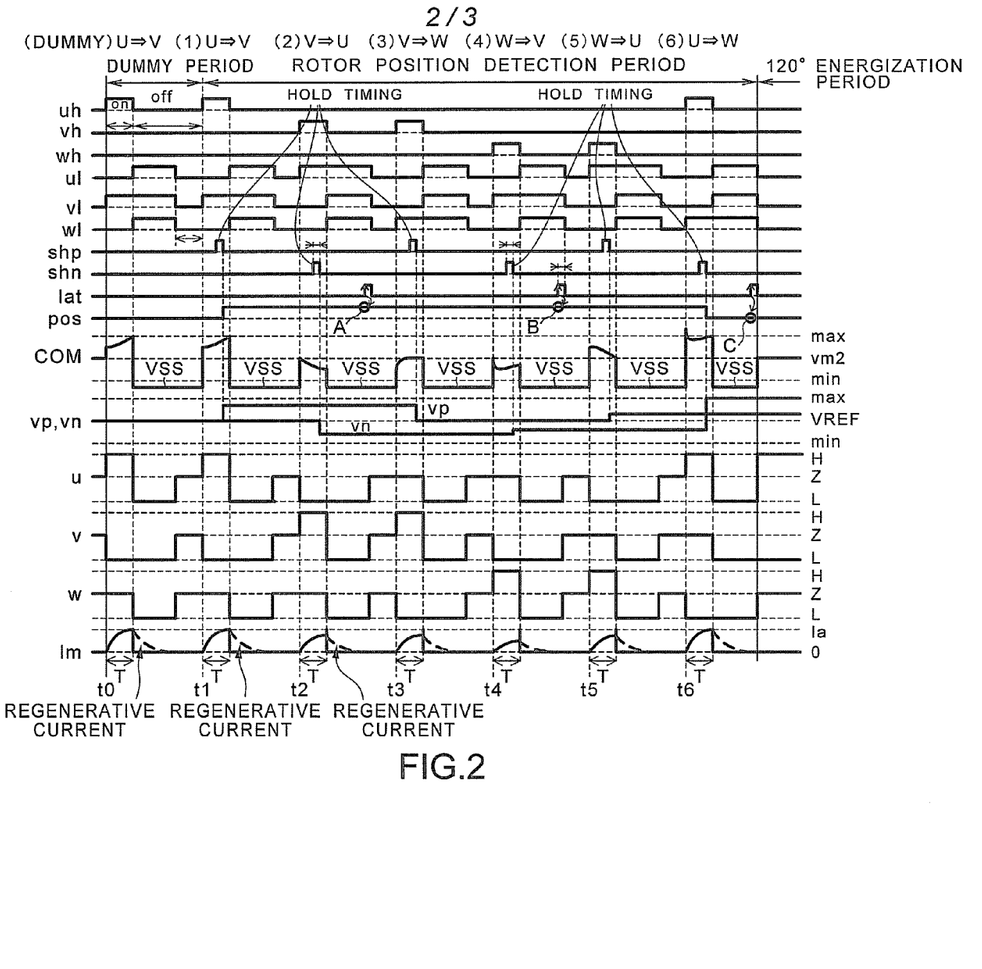
FIG. 2 is a diagram showing an example of a timing chart of the brushless motor drive system 100 shown in FIG. 1 at the time when detecting the rotor position.
Figure 3:
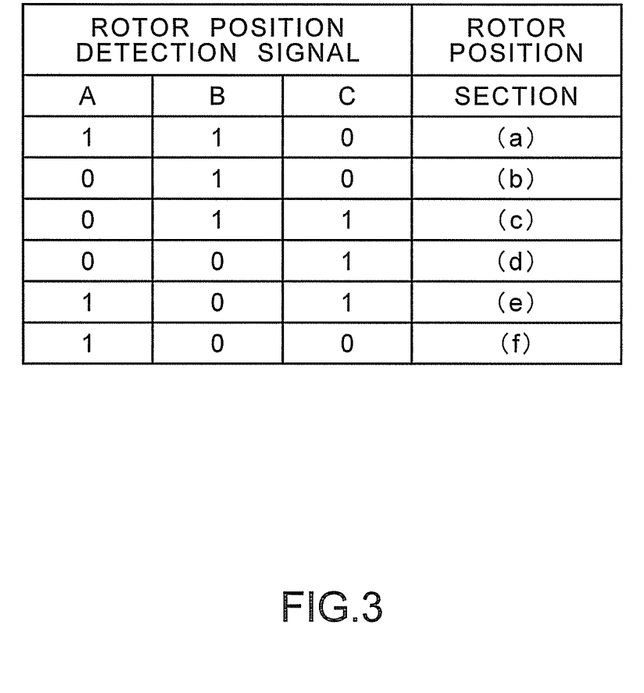
FIG. 3 is a diagram showing an example of a relation between the rotor position detection signal and the rotor position of the three-phase brushless motor.

FIG. 2 is a diagram showing an example of a timing chart of the brushless motor drive system 100 shown in FIG. 1 at the time when detecting the rotor position. FIG. 3 is a diagram showing an example of a relation between the rotor position detection signal and the rotor position of the three-phase brushless motor.

As shown in FIG. 2, the control circuit 11 first lets a dummy pulse current flow through the three-phase brushless motor 1 by controlling the power device 2 at time t0.

For example, the control circuit 11 turns on the pMOS transistors 2n and the nMOS transistor 2d and turns off the pMOS transistors 2c and 2e and the nMOS transistors 2b and 2f by providing the drive signals uh and vl with a "high" level and providing the drive signals vh, wh, ul and wl with a "low" level. This brings about a state in which a current can flow from the phase U (the first phase) coil UL to the phase V (the second phase) coil VL and no current can flow to the phase W (the third phase) coil WL.

During that time, the current detection circuit 9 measures the current Im, and the time detection circuit 10 detects the time for the current Im to arrive at the prescribed value Ia. And the control circuit 11 sets the time detected by the time detection circuit 10 as the setting time T.

Note that after elapse of the setting time T from the time t0, the control circuit 11 turns off the pMOS transistors 2a, 2c and 2e and turns on the nMOS transistors 2b, 2d and 2f by providing the drive signals uh, vh and wh with the "low" level and providing the drive signals ul, vl and wl with the "high" level. As a result, the coils of the respective phases in the three-phase brushless motor 1 are grounded and consequently influence of a regenerated current (a dashed line part of the current Im shown in FIG. 2) in the three-phase brushless motor 1 exerted on the power supply is avoided.

As described heretofore, the setting time which is current flowing pulse time for rotor position detection is determined on the basis of the time measured during the dummy current flowing.

Even if there is a kind change of the motor or dispersion in the inductor or resistor component, therefore, it is possible to generate a current flowing pulse by using a current pulse having a constant current and obtain the rotor position detection signal.

After a dummy period for determining the setting time is finished, a rotor position detection period for detecting the rotor position is started.

First, at time t1, the control circuit 11 lets a pulse current for detecting the rotor position flow through the three-phase brushless motor 1 during the setting time T by controlling the power device 2.

In other words, the control circuit 11 turns on the pMOS transistor 2a and the nMOS transistor 2d and turns off the pMOS transistors 2c and 2e and the nMOS transistors 2b and 2f by providing the drive signals uh and vl with the "high" level and providing the drive signals vh, wh, ul and wl with the "low" level.

This brings about a state in which a current is forced to flow from the phase U coil UL to the phase V coil VL and no current is forced to flow to the phase W coil WL.

As a result, the detection comparison circuit 3 compares the neutral point voltage COM which is higher than the comparison voltage vm2 with the comparison voltage vm2 and outputs the first comparison signal vdef depending upon a result of the comparison.

And the sample and hold circuit 4 samples and holds the first value of the first comparison signal vdef in a period of the setting time T from the time t1 in response to the sample and hold signal shp (the "high" level). In other words, the voltage COM assumes, for example, a value which is higher than half (vm2) of the power supply voltage VDD. As a result, the voltage vp becomes higher than the reference voltage VREF.

Note that after elapse of the setting time T from the time t1, the control circuit 11 turns off the pMOS transistors 2a, 2c and 2e and turns on the nMOS transistors 2b, 2d and 2f by providing the drive signals uh, vh and wh with the "low" level and providing the drive signals ul, vl and wl with the "high" level. As a result, the coils of the respective phases in the three-phase brushless motor 1 are grounded and consequently influence of a regenerated current (a dashed line part of the current Im shown in FIG. 2) in the three-phase brushless motor 1 exerted on the power supply is avoided.

At subsequent time t2, the control circuit 11 lets a pulse current for detecting the rotor position flow through the three-phase brushless motor 1 during the setting time T by controlling the power device 2.

In other words, the control circuit 11 turns on the pMOS transistor 2c and the nMOS transistor 2b and turns off the pMOS transistors 2a and 2e and the nMOS transistors 2d and 2f by providing the drive signals vh and ul with the "high" level and providing the drive signals uh, wh, vl and wl with the "low" level. This brings about a state in which a current is forced to flow from the phase V coil VL to the phase U coil UL and no current is forced to flow to the phase W coil WL.

As a result, the detection comparison circuit 3 compares the neutral point voltage COM which is lower than the comparison voltage vm2 with the comparison voltage vm2 and outputs the first comparison signal vdef depending upon a result of the comparison.

And the sample and hold circuit 4 samples and holds the second value of the first comparison signal vdef in a period of the setting time T from the time t2 in response to the sample and hold signal shn (the "high" level). In other words, the voltage COM assumes, for example, a value which is lower than the half (vm2) of the power supply voltage VDD. As a result, the voltage vn becomes lower than the reference voltage VREF.

In addition, the addition circuit 5 adds up the first value and the second value sampled and held in the sample and hold circuit 4, in the analog form and outputs the addition signal vadd depending upon a result of the addition. Note that a current direction in the case in which a current is forced to flow from the phase U to the phase V differs from a current direction in the case in which a current is forced to flow from the phase V to the phase U. In this case, the sampled and held voltage (value) vp differs in polarity from the sampled and held voltage (value) vn. Therefore, the addition signal vadd corresponds to a potential difference between the voltage vp and the voltage vn (an absolute value of the voltage vp−an absolute value of the voltage vn).

And the comparison output circuit 6 compares the value of the addition signal vadd with the reference voltage VREF and outputs the second comparison signal (the rotor position detection signal) pos which depends upon a result of the comparison.

And the latch circuit 7 latches a value (A: "high" level, i.e., logic "1") of the second comparison signal (the rotor position detection signal) pos in response to the latch signal lat ("high" level).

Note that after elapse of the setting time T from the time t2, the control circuit 11 turns off the pMOS transistors 2a, 2c and 2e and turns on the nMOS transistors 2b, 2d and 2f by providing the drive signals uh, vh and wh with the "low" level and providing the drive signals ul, vi and wl with the "high" level. As a result, the coils of the respective phases in the three-phase brushless motor 1 are grounded and consequently influence of a regenerated current (a dashed line part of the current Im shown in FIG. 2) in the three-phase brushless motor 1 exerted on the power supply is avoided.

At subsequent time t3, the control circuit 11 lets a pulse current for detecting the rotor position flow through the three-phase brushless motor 1 during the setting time T by controlling the power device 2.

In other words, the control circuit 11 provides the drive signals vh and wl with the "high" level and provides the drive signals uh, wh, ul and vl with the "low" level. This brings about a state in which a current is forced to flow from the phase V coil VL to the phase W coil WL and no current is forced to flow to the phase U coil UL.

As a result, the detection comparison circuit 3 compares the neutral point voltage COM which is nearly equal to the comparison voltage vm2 with the comparison voltage vm2 and outputs the first comparison signal vdef depending upon a result of the comparison.

And the sample and hold circuit 4 samples and holds the first value of the first comparison signal vdef in a period of the setting time T from the time t3 in response to the sample and hold signal shp (the "high" level). In other words, the voltage COM assumes, for example, a value which is nearly equal to the half of the power supply voltage VDD. As a result, the voltage vp becomes a voltage which is approximately the same voltage as the reference voltage VREF.

Note that after elapse of the setting time T from the time t3, the control circuit 11 turns off the pMOS transistors 2a, 2c and 2e and turns on the nMOS transistors 2b, 2d and 2f by providing the drive signals uh, vh and wh with the "low" level and providing the drive signals ul, vl and wl with the "high" level. As a result, the coils of the respective phases in the three-phase brushless motor 1 are grounded and consequently influence of a regenerated current (a dashed line part of the current Im shown in FIG. 2) in the three-phase brushless motor 1 exerted on the power supply is avoided.

At subsequent time t4, the control circuit 11 lets a pulse current for detecting the rotor position flow through the three-phase brushless motor 1 during the setting time T by controlling the power device 2.

In other words, the control circuit 11 provides the drive signals wh and vl with the "high" level and provides the drive signals uh, vh, ul and wl with the "low" level. This brings about a state in which a current is forced to flow from the phase W coil WL to the phase V coil VL and no current is forced to flow to the phase U coil UL.

As a result, the detection comparison circuit 3 compares the neutral point voltage COM which is slightly lower than the comparison voltage vm2 with the comparison voltage vm2 and outputs the first comparison signal vdef depending upon a result of the comparison.

And the sample and hold circuit 4 samples and holds the second value of the first comparison signal vdef in a period of the setting time T from the time t4 in response to the sample and hold signal shn (the "high" level). In other words, the voltage COM assumes, for example, a value which is slightly lower than the half of the power supply voltage VDD. As a result, the voltage vn becomes a voltage which is slightly lower than the reference voltage VREF.

In addition, the addition circuit 5 adds up the first value and the second value sampled and held in the sample and hold circuit 4, in the analog form and outputs the addition signal vadd depending upon a result of the addition. Note that a current direction in the case in which a current is forced to flow from the phase V to the phase W differs from a current direction in the case in which a current is forced to flow from the phase W to the phase V. In this case, the sampled and held voltage (value) vp differs in polarity from the sampled and held voltage (value) vn. Therefore, the addition signal vadd corresponds to a potential difference between the voltage vp and the voltage vn (an absolute value of the voltage vp–an absolute value of the voltage vn).

And the comparison output circuit 6 compares the value of the addition signal vadd with the reference voltage VREF and outputs the second comparison signal (the rotor position detection signal) pos which depends upon a result of the comparison.

And the latch circuit 7 latches a value (B: "high" level, Le., logic "1") of the second comparison signal (the rotor position detection signal) pos in response to the latch signal lat ("high" level).

Note that after elapse of the setting time T from the time t4, the control circuit 11 turns off the pMOS transistors 2a, 2c and 2e and turns on the nMOS transistors 2b, 2d and 2f by providing the drive signals uh, vh and wh with the "low" level and providing the drive signals ul, vl and wl with the "high" level. As a result, the coils of the respective phases in the three-phase brushless motor 1 are grounded and consequently influence of a regenerated current (a dashed line part of the current Im shown in FIG. 2) in the three-phase brushless motor 1 exerted on the power supply is avoided.

At subsequent time t5, the control circuit 11 lets a pulse current for detecting the rotor position flow through the three-phase brushless motor 1 during the setting time T by controlling the power device 2.

In other words, the control circuit 11 provides the drive signals wh and ul with the "high" level and provides the drive signals uh, vh, vl and wl with the "low" level. This brings about a state in which a current is forced to flow from the phase W coil WL to the phase U coil UL and no current is forced to flow to the phase V coil VL.

As a result, the detection comparison circuit 3 compares the neutral point voltage COM which is slightly higher than the comparison voltage vm2 with the comparison voltage vm2 and outputs the first comparison signal vdef depending upon a result of the comparison.

And the sample and hold circuit 4 samples and holds the first value ("high" level which is here the logic "1") of the first comparison signal vdef in a period of the setting time T from the time t5 in response to the sample and hold signal shp (the "high" level). In other words, the voltage COM assumes, for example, a value which is slightly higher than the half of the power supply voltage VDD. As a result, the voltage vp becomes slightly higher than the reference voltage VREF.

Note that after elapse of the setting time T from the time t5, the control circuit 11 turns off the pMOS transistors 2a, 2c and 2e and turns on the nMOS transistors 2b, 2d and 2f by providing the drive signals uh, vh and wh with the "low" level and providing the drive signals ul, vl and wl with the "high" level. As a result, the coils of the respective phases in the three-phase brushless motor 1 are grounded and consequently influence of a regenerated current (a dashed line part of the current Im shown in FIG. 2) in the three-phase brushless motor 1 exerted on the power supply is avoided.

At subsequent time t6, the control circuit 11 lets a pulse current for detecting the rotor position flow through the three-phase brushless motor 1 during the setting time T by controlling the power device 2.

In other words, the control circuit 11 provides the drive signals uh and wl with the "high" level and provides the drive signals vh, wh, ul and vl with the "low" level. This brings about a state in which a current is forced to flow from the phase U coil UL to the phase W coil WL and no current is forced to flow to the phase V coil VL.

As a result, the detection comparison circuit 3 compares the neutral point voltage COM which is higher than the comparison voltage vm2 with the comparison voltage vm2 and outputs the first comparison signal vdef depending upon a result of the comparison.

And the sample and hold circuit 4 samples and holds the second value of the first comparison signal vdef in a period of the setting time T from the time t6 in response to the sample and hold signal shn. In other words, the voltage COM assumes, for example, a value which is higher than the half of the power supply voltage VDD. As a result, the voltage vn becomes a voltage which is higher than the reference voltage VREF.

In addition, the addition circuit 5 adds up the first value and the second value sampled and held in the sample and hold circuit 4, in the analog form and outputs the addition signal vadd depending upon a result of the addition. Note that a current direction in the case in which a current is forced to flow from the phase W to the phase U differs from a current direction in the case in which a current is forced to flow from the phase U to the phase W. In this case, the sampled and held voltage (value) vp differs in polarity from the sampled and held voltage (value) vn. Therefore, the addition signal vadd corresponds to a potential difference between the voltage vp and the voltage vn (an absolute value of the voltage vp−an absolute value of the voltage vn).

And the comparison output circuit 6 compares the value of the addition signal vadd with the reference voltage VREF and outputs the second comparison signal (the rotor position detection signal) pos which depends upon a result of the comparison.

And the latch circuit 7 latches a value (C: "low" level, i.e., logic "0") of the second comparison signal (the rotor position detection signal) pos in response to the latch signal lat ("high" level).

Note that after elapse of the setting time T from the time t6, the control circuit 11 turns off the pMOS transistors 2a, 2c and 2e and turns on the nMOS transistors 2b, 2d and 2f by providing the drive signals uh, vh and wh with the "low" level and providing the drive signals ul, vl and wl with the "high" level. As a result, the coils of the respective phases in the three-phase brushless motor 1 are grounded and consequently influence of a regenerated current (a dashed line part of the current Im shown in FIG. 2) in the three-phase brushless motor 1 exerted on the power supply is avoided.

Owing to the operation of the brushless motor drive system 100 in the rotor position detection period described heretofore, the values A, B and C of the second comparison signal (the rotor position detection signal) pos are obtained.

The value of the current Im which flows in each setting time T of the rotor position detection period differs depending upon the actual rotor position of the three-phase brushless motor 1. Corresponding to this, the neutral point voltage COM in each setting time T of the rotor position detection period also differs in level depending upon the rotor position. And the voltages vn and vp also differ in level according to the rotor position.

In other words, the neutral point voltage COM changes if the magnitude of the current Im changes. Therefore, there is correlation between the magnitude of the current Im and the values (voltages) vp and vn sampled and held by the sample and hold circuit 4. And the second comparison signal (the rotor position detection signal) which is output from the comparison output circuit changes according to a result of addition of the values (voltages) vp and vn sampled and held by the sample and hold circuit 4.

Therefore, it becomes possible to discriminate the rotor position of the three-phase brushless motor 1 on the basis of the second comparison signal (the rotor position detection signal).

Furthermore, in order to facilitate the detection of the rotor position, dummy current flowing is conducted first, the setting time T required to arrive at the predetermined current Ia is measured, and then the rotor position detection pulse is generated with this setting time T. Even if there is dispersion in the motor, therefore, the rotor position detection pulse can be generated with a certain determinate current.

In FIG. 3, sections (a) to (f) of the rotor position corresponding respectively to sections obtained by dividing the electric angle of the rotor of the thee-phase brushless motor 1 into six parts. As shown in FIG. 3, for example, if values A, B and C of the rotor position detection signal are respectively "1," "1," and "0," the rotor position is in the section (a) of the rotor electric angle. If the values A, B and C of the rotor position detection signal are respectively "0," "0," and "1," the rotor position is in the section (d).

In the example shown in FIG. 2 and already described, the values A, B and C of the rotor position detection signal are respectively "1," "1," and "0." Therefore, the rotor position is in the section (a) obtained by dividing the electric angle of the rotor in the three-phase brushless motor 1 into six parts.

Then, the discrimination circuit 8 discriminates the rotor position of the three-phase brushless motor 1 by using, for example, the above-described table shown in FIG. 3 in response to the value latched in the latch circuit 7. As a result, the rotor position of the three-phase brushless motor 1 is discriminated on the basis of the second comparison signal.

And the control circuit 11 controls the power device 2 to forcibly letting a current flow through the three-phase brushless motor 1 (for example, at 120°) and rotate it in a predetermined direction on the basis of the rotor position discriminated by the discrimination circuit 8.

As a result, it becomes possible to accelerate the three-phase brushless motor 1 in a direction in which the motor is to be rotated without inversely rotating it and detect the induced voltage of the motor. And a sensorless drive can be conducted smoothly.

On the other hand, in the conventional technique already described, the induced voltage is not generated if the motor stops in the case of the sensorless motor drive. Therefore, the rotor position cannot be detected from the induced voltage.

However, the brushless motor driver according to the present first embodiment can detect the rotor position of the motor by using the pulse for detecting the rotor position even if the motor stops, as described above. And since the rotor position can be detected without rotating the rotor, the motor start time of the sensorless start can be made shorter.

Furthermore, since the brushless motor driver according to the present first embodiment starts the forced current flowing after detecting the rotor position, it can be avoided for the motor to rotate in a direction opposite to a desired direction.

In the brushless motor driver according to the present first embodiment, the start time of the motor can be shortened as described heretofore.

In the above-described embodiment, the case in which the object compared with the comparison voltage vm2 in the detection comparison circuit 3 is the neutral point voltage COM has been described. However, a voltage (a voltage at a virtual neutral point) at a node (a virtual neutral point) connected in common to the three-phase coils UL, VL and WL respectively of the phase U, phase V and phase W respectively via resistors may be input to the detection comparison circuit 3 instead of the neutral point voltage at the neutral point CN1.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A brushless motor driver that drives a three-phase brushless motor, the brushless motor driver comprising:
a detection comparison circuit which compares a neutral point voltage at a neutral point of the three-phase brushless motor with a comparison voltage obtained by dividing a voltage between terminals of a power device, which is supplied with a power supply voltage to supply drive voltages to the three-phase brushless motor, respectively connected to a power supply and ground to halves, and outputs a first comparison signal depending upon a result of the comparison;

a sample and hold circuit which samples and holds a first value of the first comparison signal in a first case in which a current is forced to flow from a first phase coil of the three-phase brushless motor to a second phase coil and no current is forced to flow to a third phase coil in a first period having a preset setting time and a second value of the first comparison signal in a second case in which a current is forced to flow from the second phase coil to the first phase coil and no current is forced to flow to the third phase coil in a second period having the preset setting time subsequent to the first period;

an addition circuit which adds up the first value and the second value sampled and held by the sample and hold circuit and outputs an addition signal depending upon a result of the addition;

a comparison output circuit which compares a value of the addition signal with a reference voltage and outputs a second comparison signal depending upon a result of the comparison, a position of a rotor in the three-phase brushless motor being discriminated on the basis of the second comparison signal;

a first voltage division resistor that is connected at a first end thereof to a first terminal of the power device, the first terminal connected to the power supply; and a second voltage division resistor that is connected at a first end thereof to a second end of the first voltage division resistor, and connected at a second end thereof to a second terminal of the power device, the second terminal connected to the ground, wherein the comparison voltage is a voltage-divided voltage obtained by conducting voltage division on the voltage between the terminals of the power device which are respectively connected to the power supply and the ground with a ratio of 1:1, and wherein the comparison voltage is a voltage at a node between the first voltage division resistor and the second voltage division resistor.

2. The brushless motor driver according to claim 1, further comprising:
a latch circuit that is configured to latch a value of the second comparison signal; and
a discrimination circuit that is configured to discriminate the rotor position of the three-phase brushless motor on the basis of a value latched in the latch circuit.

3. The brushless motor driver according to claim 1, further comprising
a control circuit that controls the power device to force to let a current through the three-phase brushless motor and rotate the three-phase brushless motor on the basis of the position of the rotor discriminated.

4. The brushless motor driver according to claim 1, wherein the power device comprises:
a first MOS transistor having a first end connected to the power supply and a second end connected to the first phase coil;
a first diode having a cathode connected to the first end of the first MOS transistor and a anode connected to the second end of the first MOS transistor;
a second MOS transistor having a first end connected to the second end of the first MOS transistor and a second end connected to the ground; and
a second diode having a cathode connected to the first end of the second MOS transistor and a anode connected to the second end of the second MOS transistor, wherein a voltage between the terminals of the power device which are respectively connected to the power supply and the ground is a voltage between the first end of the first MOS transistor and the second end of the second MOS transistors.

5. The brushless motor driver according to claim 1, further comprising:
a current detection circuit which detects a current flowing to the power device in a state in which a dummy current is forced to flow from the first phase coil to the second phase coil and no dummy current is not forced to flow to the third phase coil; and
a time detection circuit which detects a time between start of the dummy current flowing and arrival of the current detected by the current detection circuit at a prescribed value,
the time detected by the time detection circuit being set as the setting time.

6. The brushless motor driver according to claim 1, wherein the detection comparison circuit comprises:
a first detection voltage follower circuit that is configured to be supplied with the comparison voltage;
a second detection voltage follower circuit that is configured to be supplied with the neutral point voltage; and
a detection operational amplifier that is configured to compare an output of the first detection voltage follower circuit with an output of the second detection voltage follower circuit, and to output the first comparison signal depending upon a result of the comparison.

7. The brushless motor driver according to claim 1, wherein the sample and hold circuit comprises:
a first transmission gate that is configured to be supplied at a first end thereof with the first comparison signal and to turn on during the first period;
a first capacitor that is connected between a second end of the first transmission gate and the ground;
a first sample and hold voltage follower circuit that is configured to be supplied with a voltage at a first end of the first capacitor and to output a first voltage corresponding to the first value;
a second transmission gate that is configured to be supplied at a first end thereof with the first comparison signal and to turn on during the second period;
a second capacitor that is connected between a second end of the second transmission gate and the ground; and
a second sample and hold voltage follower circuit that is configured to be supplied with a voltage at a first end of the second capacitor and to output a second voltage corresponding to the second value.

8. The brushless motor driver according to claim 7, wherein the addition circuit comprises:
a first addition resistor that is connected at a first end thereof to the output of the first sample and hold voltage follower circuit;
a second addition resistor that is connected at a first end thereof to the output of the second sample and hold voltage follower circuit, and that is connected at a second end thereof to a second end of the first addition resistor; and
an addition operational amplifier that is configured to compare a voltage at a node between the first addition resistor and the second addition resistor with a voltage at a second end of the bias resistor connected at a first end thereof to the reference voltage, and to output the addition signal on the basis of the comparison.

9. The brushless motor driver according to claim 8, wherein the comparison output circuit comprises:

an output resistor that is connected at a first end thereof to an output of the addition operational amplifier; and an output comparator that is configured to compare a voltage at a second end of the output resistor with the reference voltage and to output the second comparison signal which depends upon a result of the comparison.

10. The brushless motor driver according to claim 1, wherein the neutral point voltage is a voltage at the neutral point, the first phase coil, the second phase coil, and the third phase coil are connected commonly to the neutral point.

11. A brushless motor drive system comprising:
a three-phase brushless motor;
a power device that is configured to be supplied with a power supply voltage, and to supply drive voltages to the three-phase brushless motor;
a brushless motor driver that controls the power device, wherein the brushless motor driver comprising:
a detection comparison circuit which compares a neutral point voltage at a neutral point of the three-phase brushless motor with a comparison voltage obtained by dividing a voltage between terminals of a power device, which is supplied with a power supply voltage to supply drive voltages to the three-phase brushless motor, respectively connected to a power supply and ground to halves, and outputs a first comparison signal depending upon a result of the comparison;
a sample and hold circuit which samples and holds a first value of the first comparison signal in a first case in which a current is forced to flow from a first phase coil of the three-phase brushless motor to a second phase coil and no current is forced to flow to a third phase coil in a first period having a preset setting time and a second value of the first comparison signal in a second case in which a current is forced to flow from the second phase coil to the first phase coil and no current is forced to flow to the third phase coil in a second period having the preset setting time subsequent to the first period;
an addition circuit which adds up the first value and the second value sampled and held by the sample and hold circuit and outputs an addition signal depending upon a result of the addition;
a comparison output circuit which compares a value of the addition signal with a reference voltage and outputs a second comparison signal depending upon a result of the comparison, a position of a rotor in the three-phase brushless motor being discriminated on the basis of the second comparison signal;
a first voltage division resistor that is connected at a first end thereof to a first terminal of the power device, the first terminal connected to the power supply; and
a second voltage division resistor that is connected at a first end thereof to a second end of the first voltage division resistor, and connected at a second end thereof to a second terminal of the power device, the second terminal connected to the ground,
wherein the comparison voltage is a voltage-divided voltage obtained by conducting voltage division on the voltage between the terminals of the power device which are respectively connected to the power supply and the ground with a ratio of 1:1, and
wherein the comparison voltage is a voltage at a node between the first voltage division resistor and the second voltage division resistor.

12. The brushless motor drive system according to claim 11, wherein brushless motor driver further comprising:
a latch circuit that is configured to latch a value of the second comparison signal; and
a discrimination circuit that is configured to discriminate the rotor position of the three-phase brushless motor on the basis of a value latched in the latch circuit.

13. The brushless motor drive system according to claim 11, wherein brushless motor driver further comprising:
a control circuit that controls the power device to force to let a current through the three-phase brushless motor and rotate the three-phase brushless motor on the basis of the position of the rotor discriminated.

14. The brushless motor drive system according to claim 11, wherein the power device comprises:
a first MOS transistor having a first end connected to the power supply and a second end connected to the first phase coil;
a first diode having a cathode connected to the first end of the first MOS transistor and a anode connected to the second end of the first MOS transistor;
a second MOS transistor having a first end connected to the second end of the first MOS transistor and a second end connected to the ground; and
a second diode having a cathode connected to the first end of the second MOS transistor and a anode connected to the second end of the second MOS transistor,
wherein a voltage between the terminals of the power device which are respectively connected to the power supply and the ground is a voltage between the first end of the first MOS transistor and the second end of the second MOS transistors.

15. The brushless motor drive system according to claim 11, wherein brushless motor driver further comprising:
a current detection circuit which detects a current flowing to the power device in a state in which a dummy current is forced to flow from the first phase coil to the second phase coil and no dummy current is not forced to flow to the third phase coil; and
a time detection circuit which detects a time between start of the dummy current flowing and arrival of the current detected by the current detection circuit at a prescribed value,
the time detected by the time detection circuit being set as the setting time.

16. The brushless motor drive system according to claim 11, wherein the detection comparison circuit comprises:
a first detection voltage follower circuit that is configured to be supplied with the comparison voltage;
a second detection voltage follower circuit that is configured to be supplied with the neutral point voltage; and
a detection operational amplifier that is configured to compare an output of the first detection voltage follower circuit with an output of the second detection voltage follower circuit, and to output the first comparison signal depending upon a result of the comparison.

17. The brushless motor drive system according to claim 11, wherein the sample and hold circuit comprises:
a first transmission gate that is configured to be supplied at a first end thereof with the first comparison signal and to turn on during the first period;
a first capacitor that is connected between a second end of the first transmission gate and the ground;
a first sample and hold voltage follower circuit that is configured to be supplied with a voltage at a first end of the first capacitor and to output a first voltage corresponding to the first value;
a second transmission gate that is configured to be supplied at a first end thereof with the first comparison signal and to turn on during the second period;

a second capacitor that is connected between a second end of the second transmission gate and the ground; and a second sample and hold voltage follower circuit that is configured to be supplied with a voltage at a first end of the second capacitor and to output a second voltage corresponding to the second value.

18. The brushless motor drive system according to claim 17, wherein the addition circuit comprises:

a first addition resistor that is connected at a first end thereof to the output of the first sample and hold voltage follower circuit;

a second addition resistor that is connected at a first end thereof to the output of the second sample and hold voltage follower circuit, and that is connected at a second end thereof to a second end of the first addition resistor; and an addition operational amplifier that is configured to compare a voltage at a node between the first addition resistor and the second addition resistor with a voltage at a second end of the bias resistor connected at a first end thereof to the reference voltage, and to output the addition signal on the basis of the comparison.

19. A brushless motor driver that drives a three-phase brushless motor, the brushless motor driver comprising:

a detection comparison circuit which compares a neutral point voltage at a neutral point of the three-phase brushless motor with a comparison voltage, and outputs a first comparison signal depending upon a result of the comparison;

a sample and hold circuit which samples and holds a first value of the first comparison signal in a first case in which a current is forced to flow from a first phase coil of the three-phase brushless motor to a second phase coil and no current is forced to flow to a third phase coil in a first period having a preset setting time and a second value of the first comparison signal in a second case in which a current is forced to flow from the second phase coil to the first phase coil and no current is forced to flow to the third phase coil in a second period having the preset setting time subsequent to the first period;

an addition circuit which adds up the first value and the second value sampled and held by the sample and hold circuit and outputs an addition signal depending upon a result of the addition;

a comparison output circuit which compares a value of the addition signal with a reference voltage and outputs a second comparison signal depending upon a result of the comparison;

a current detection circuit which detects a current flowing to the power device in a state in which a dummy current is forced to flow from the first phase coil to the second phase coil and no dummy current is not forced to flow to the third phase coil;

a time detection circuit which detects a time between start of the dummy current flowing and arrival of the current detected by the current detection circuit at a prescribed value, the time detected by the time detection circuit being set as the setting time, and a position of a rotor in the three-phase brushless motor being discriminated on the basis of the second comparison signal;

a first voltage division resistor that is connected at a first end thereof to a first terminal of the power device, the first terminal connected to the power supply; and a second voltage division resistor that is connected at a first end thereof to a second end of the first voltage division resistor, and connected at a second end thereof to a second terminal of the power device, the second terminal connected to the ground, wherein the comparison voltage is a voltage-divided voltage obtained by conducting voltage division on the voltage between terminals of a power device which are respectively connected to a power supply and a ground with a ratio of 1:1, and wherein the comparison voltage is a voltage at a node between the first voltage division resistor and the second voltage division resistor.

* * * * *